Patented Nov. 8, 1949

2,487,462

UNITED STATES PATENT OFFICE 2,487,462

METHOD OF ELECTRIC RESISTANCE WELDING

Adolf Meyer, Kusnacht, Switzerland, assignor to Aktiengesellschaft Brown, Boveri & Cie, Baden, Switzerland, a joint-stock company No Drawing. Application February 8, 1949, Serial No. 75,300. In Switzerland January 4, 1946

4 Claims. (Cl. 219—10)

This invention relates to the art of electric butt welding and is a continuation-in-part of my co-pending application Serial No. 656,158 filed March 21, 1946.

Conventional methods of electrical butt welding are far from satisfactory. Many of the disadvantages stem from the fact that it is impossible, without first machining the abutting surfaces, to obtain an initial uniform contact between the surfaces to be welded. Although the surfaces may appear planar to an observer they are in fact quite rough with the result that minute irregular interstices are established when the two surfaces are brought together under initial pressure prior to switching-on of the current. The initial resistance to flow of the electric heating current across the junction is thus far from uniform with the result that those parts which are in closer surface contact carry a larger share of the current than the other parts and hence are heated to a higher temperature. Because of the expansion of these more highly heated parts, the initial contact between the two surfaces then becomes even worse temporarily until the current which is selected in accordance with the surface area to be welded causes the more highly heated parts to melt and burn away under a shower of sparks so that further parts of the two surfaces then come into intimate contact and are heated. With such method of welding which thus can figuratively be said to progress from point-to-point, considerable oxidation occurs and the resulting oxides have to be removed from the welding junction if a good weld strength factor is to be achieved. In practice, the oxides are removed by melting a very large mass of the metal to be welded and squeezing the molten metal away to the side of the weld junction to assure that all such oxides will have been carried off with the melted metal.

The disadvantages of this method of welding are obvious. First there is no assurance that all oxides have been eliminated; secondly an unnecessarily large amount of the metals and of the current is wasted; and thirdly it is necessary to machine the weld junction afterwards to remove the high peripheral ridge caused by the squeezed out oxides and metal.

The object of the present invention is to provide an improved method of butt welding which will assure uniformly strong welds, consume relatively less current and produce a weld that requires no subsequent machining. The new method accordingly reflects not only an economy in welding efficiency but also an improvement in the quality and appearance of the weld itself.

In accordance with this invention, the surfaces to be butt welded are first brought together under an initial, moderate pressure, and the small interstices which for the most part will usually be of capillary magnitude assuming the welding faces to be reasonably smooth, are filled up with a liquid metal before the welding phase with its strong oxidation phenomena begins to take place. This metal which thus must have a lower melting point than the parts to be welded, can be conveniently termed "contact" metal, and serves two functions. First, by filling up all the minute interstices between the two abutting faces, it renders the electrical resistance substantially uniform over the entire area through which the current flows thereby eliminating any hot spots and establishing uniform heating of the weld junction; secondly by filling these interstices, oxygen is naturally excluded from such places and thus undesirable oxidation of the metal faces is inhibited. To minimize oxidation still further, it is also desirable to surround the weld junction with a non-oxidizing medium such as hydrogen.

After the contact metal placed at the weld junction has been melted by a relatively low order of current passed through the parts to be welded and flows into the interstices, the electric current and pressure between the faces are increased appreciably and rather abruptly whereupon the temperature of the faces to be welded will then rise rapidly to the level at which they become plastic, so that any surface irregularities originally present in the faces are then pressed flat by the increased pressure and the liquid contact metal therebetween is squeezed out to the side. As the temperature of the weld junction rises about the melting point of the contact metal, some of the latter will also be removed by vaporization. However, it has been found that most of it is removed by being squeezed out to the side as the abutting faces to be welded become plastic and move into more intimate contact. The final welding phase begins simultaneously with removal of the contact metal, the welding taking place continuously over the entire surface of the faces until the contact metal has been entirely expressed and the abutting faces fused.

After the weld has been completed, a portion of the contact metal will be found at the periphery of the weld junction. However, in view of the small amount of contact metal required (a piece of copper wire 30 mm. long and .7 mm. diameter being all that is required for a weld junction measuring 180 sq. mm. in area) the mass of copper deposited around the weld junction in the form of a peripheral ridge is inconsequential and hence is not so unsightly as to necessitate its removal by machining. In fact, in most cases, the low ridge of deposited contact metal will actually improve the appearance of the welded joint.

In practicing the invention, the contact metal may be of different forms and applied in various ways, the important factor of course being to cause it to flow into the weld junction before the high surface points burn and flash. One way found satisfactory when butt welding ferrous cylindrical rods of 10 mm. in diameter in end-to-end relation has been to first clamp the rods in a welding machine and bring the rod ends together under an initial pressure of 50 kg./sq. cm. Around the rods at the welding junction was then placed a band of small copper wire 1 mm. in diameter. A current of 3250 amps. was then sent through the rods until the copper wire melted and was drawn by capillary attraction into the minute interstices between the abutting end faces of the rods. This was found to require 6.1 seconds after the current was switched on. The pressure was then increased to 200 kg./sq. cm. and the current increased to 5900 amperes. Due to the increased current, the end faces of the rods soon became plastic causing most of the liquid copper to be expressed out to the side from between the faces. The remainder of the copper was removed by vaporization. Continued heating of the faces then caused the surface layers thereof to melt and fuse together thus completing the weld. The time required to complete the weld from the instant the current and pressures were increased was very short being only 1.5 seconds. All during the process, hydrogen was blown onto the welding junction through a small tube to establish an atmosphere of non-oxidizing gas around the junction in order to exclude the surrounding air.

As an alternative to binding the contact metal in place around the weld junction, it may be placed between the faces to be butt welded either in the form of a wire or very thin sheet.

Having now described my improved method of butt welding what I claim to be patentable is:

1. The method of uniting two metallic parts by the resistance welding process comprising the steps of bringing the faces of the two parts to be welded together under pressure with a third and lower melting point contact metal disposed adjacent the weld junction and in contact with both of said parts, initially heating said parts electrically by passing a current therethrough from one part to the other across the said faces thereof to a temperature sufficient to cause said contact metal to liquify and fill such interstices as may exist between the faces of the two parts to be welded due to surface irregularities thereby establishing a substantially uniform resistance path across the entire surface to be welded, and thereafter increasing said current to effect removal of said contact metal from between the faces to be welded and fusion of the surface layers of the latter.

2. The method of welding as defined in claim 1 wherein said contact metal is constituted by a metallic band placed around the metallic parts at the junction therebetween and in contact therewith.

3. The method of welding as defined in claim 1 wherein said contact metal is constituted by a metallic piece placed between the confronting faces to be welded.

4. The method of uniting two metallic parts by the resistance welding process comprising the steps of bringing the faces of the two parts together under an initial pressure with a third and lower melting point contact metal disposed adjacent the weld junction and in contact with both of said parts, passing an initial current from one of said parts to the other across the said faces thereof sufficient to cause said contact metal to liquify and fill such interstices as may exist between the faces of the parts to be welded due to surface irregularities thereby establishing a substantially uniform resistance path across the entire surface to be welded, and thereafter increasing said current and the pressure between said parts to effect removal of said melted contact metal from between the faces of the parts to be welded and fusion of the surface layers of the latter.

ADOLF MEYER.

REFERENCES CITED

The following references are of record in the file of this patent:

UNITED STATES PATENTS

| Number | Name | Date |
|---|---|---|
| 1,414,822 | Ledwinka | May 2, 1922 |
| 2,001,688 | Paugh | May 14, 1935 |

FOREIGN PATENTS

| Number | Country | Date |
|---|---|---|
| 65,888 | Austria | July 25, 1914 |
| 493,741 | Great Britain | May 14, 1935 |
| 825,910 | France | Dec. 16, 1937 |